No. 898,155. PATENTED SEPT. 8, 1908.
T. J. THORP.
MOWING AND RAKING MACHINE.
APPLICATION FILED APR. 17, 1905.
4 SHEETS—SHEET 3.
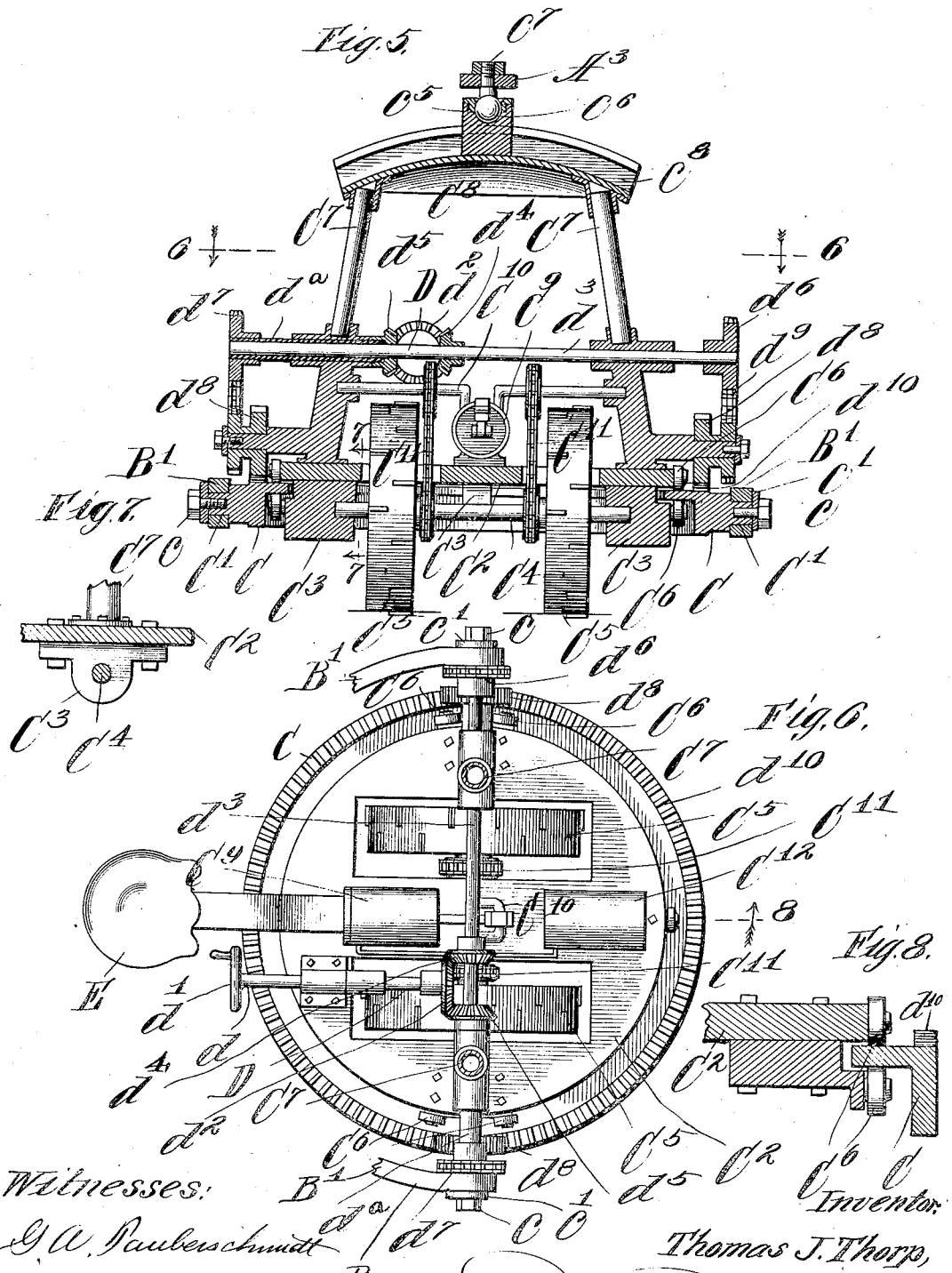

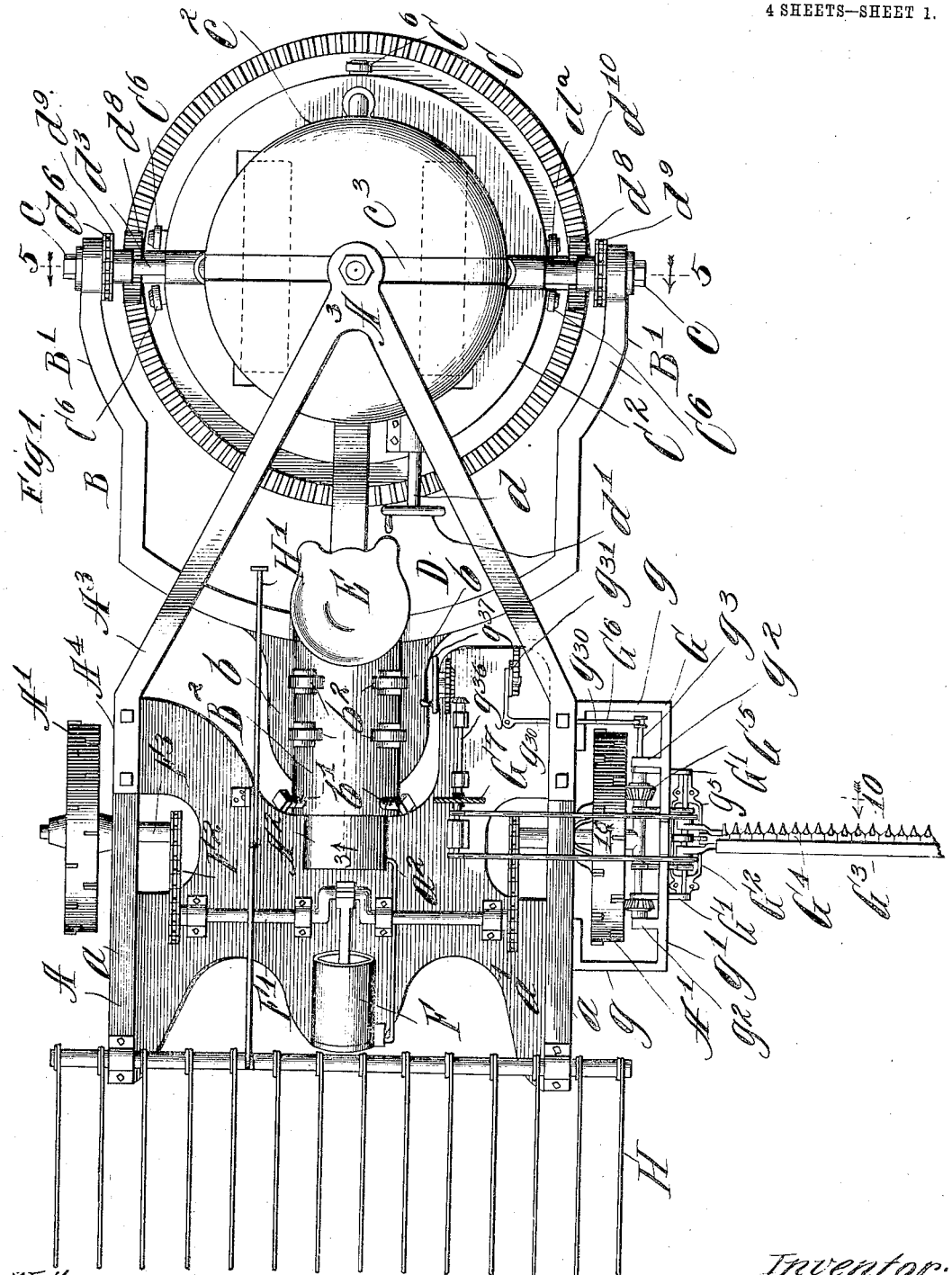

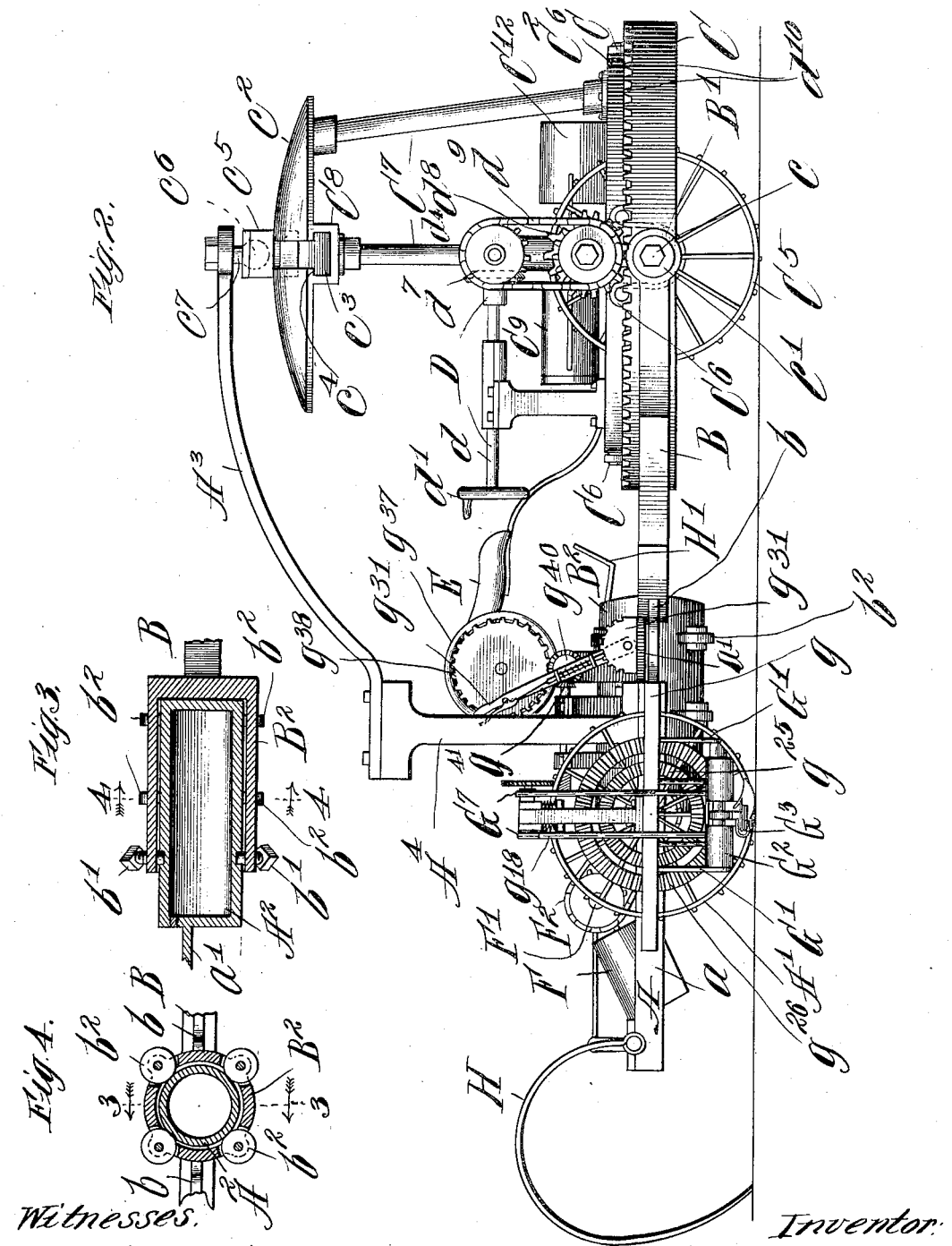

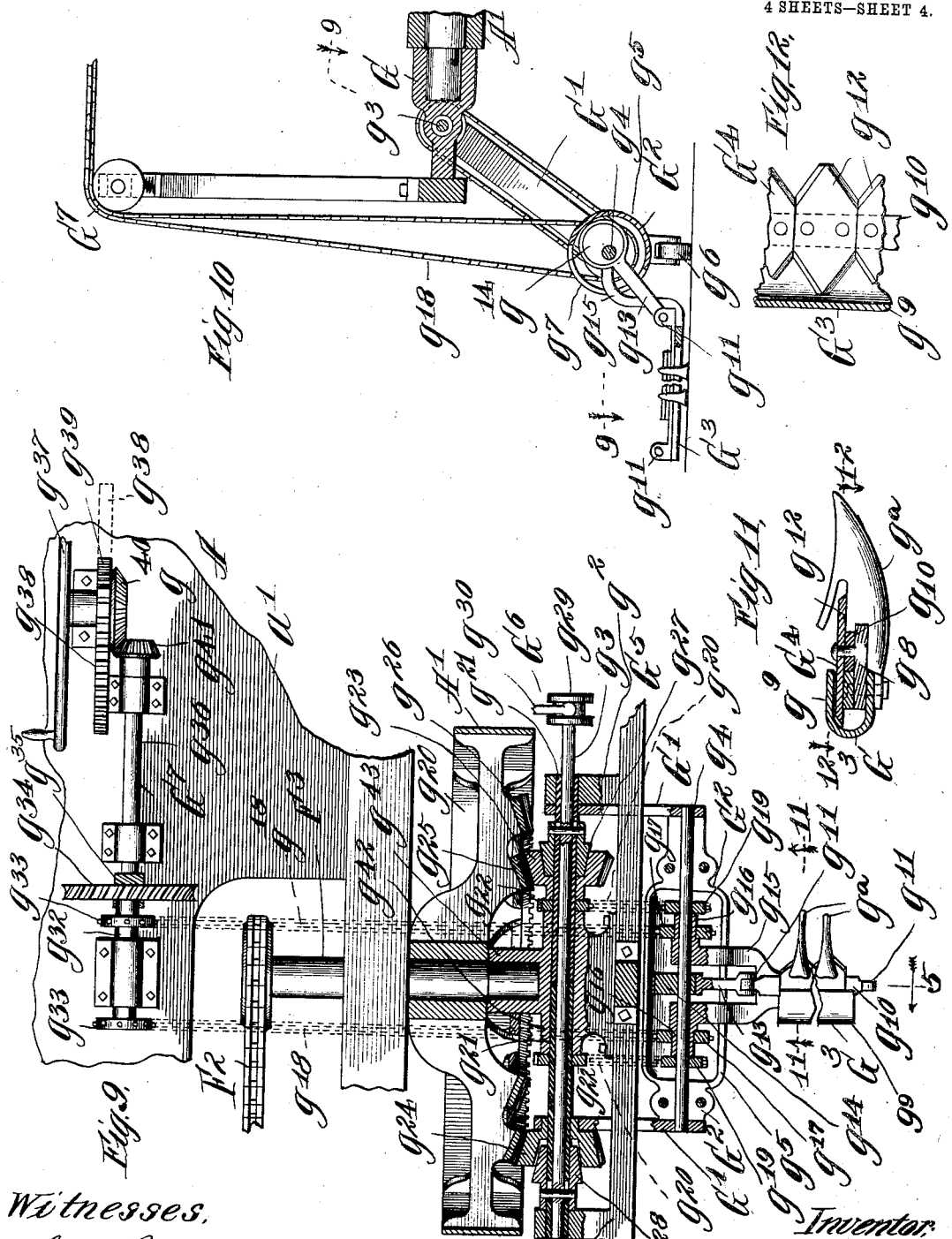

ATENT OFFICE.

THOMAS J. THORP, OF CORVALLIS, OREGON, ASSIGNOR TO T. J. THORP MANUFACTURING COMPANY, OF CORVALLIS, OREGON.

MOWING AND RAKING MACHINE.

No. 898,155.

Specification of Letters Patent.

Patented Sept. 8, 1908.

Application filed April 17, 1905. Serial No. 255,937.

To all whom it may concern:

Be it known that I, THOMAS J. THORP, a citizen of the United States, residing at Corvallis, in the county of Benton and State of Oregon, have invented a new and useful Improvement in Mowing and Raking Machines, of which the following is a specification.

My invention relates particularly to self-propelled combination mowing and raking machines, although certain features of the invention may be found useful in machines which are not self-propelled.

My primary object is to provide a thoroughly practicable self-propelled combination mowing and raking machine, having regard, in the construction thereof, to the features of adaptability to all character of ground and to the provision of adequate tractive power.

The invention is illustrated in its preferred embodiment in the accompanying drawings, in which—

Figure 1 represents a plan view of my improved combination mowing and raking machine; Fig. 2, a side elevational view of the same; Fig. 3, a broken section showing a detail of the connection between the flexibly connected front and rear portions of the frame of the machine, the section being taken as indicated at line 3 of Figs. 1 and 4; Fig. 4, a section taken as indicated at line 4 of Fig. 3; Fig. 5, a section taken as indicated at line 5 of Fig. 1; Fig. 6, a plan section of the front portion of the machine, taken as indicated at line 6 of Fig. 5; Fig. 7, a broken section taken as indicated at line 7 of Fig. 5; Fig. 8, an enlarged broken section taken as indicated at line 8 of Fig. 6; Fig. 9, a broken section taken as indicated at line 9 of Fig. 10; Fig. 10, a broken section taken as indicated at line 10 of Fig. 1; Fig. 11, an enlarged sectional view of the sickle and finger-bar, the section being taken as indicated at line 11 of Fig. 9; and Fig. 12, a broken section taken as indicated at line 12 of Fig. 11.

In the construction shown, A represents a rear frame-section supported on a pair of wheels $A^1$ and equipped with a hollow swivel-section $A^2$ in the plane of the main portion of the frame, and provided with a forwardly-extending reach $A^3$ supported on standards $A^4$ at a suitable distance above the main portion of the frame; B, a yoke-form frame-section, or lower reach, having bifurcations $B^1$, and equipped at its rear end with a swivel-section $B^2$ connected with the swivel-section $A^2$; C, an annular frame-member provided laterally, with trunnions $C^1$ journaled in the ends of the bifurcations $B^1$; $C^2$, a circular wheel-frame equipped on its lower side with brackets $C^3$, in which is journaled the shaft $C^4$ of a pair of front wheels $C^5$, said frame being equipped with rollers $C^6$ which form the anti-friction bearings between the wheel-frame $C^2$ and the ring C; $C^7$, a standard supported on the frame $C^2$ and equipped at its top with a curved transverse guide $C^8$ with which the front end of the reach $A^3$ is slidably connected, the curve of said guide being struck upon an arc having its center in the axis of the swivel $A^2$, $B^2$; $C^9$, an engine mounted on the frame $C^2$ and having its piston connected with a crank-shaft $C^{10}$ joined by sprocket-chains $C^{11}$ to the axle $C^4$; $C^{12}$, a gasolene-tank containing the supply of oil for the engine $C^9$; D, steering mechanism mounted on the frame $C^2$ and connected with the annular frame-member C; E, a seat mounted on the circular frame $C^2$; F, an engine-cylinder mounted on the frame-section A and having its piston connected with a crank-shaft $F^1$, joined by sprocket-wheels $F^2$ to the stub-axles $F^3$, of the wheels $A^1$; G, a bracket projecting from one side of the frame-section A; $G^1$, a pair of links connected at their upper ends with the bracket G and at their lower ends with a casing $G^2$ with which is pivotally connected the finger-bar $G^3$ in which is slidably mounted the sickle $G^4$; $G^5$, sickle-operating mechanism operated by one of the wheels $A^1$ and controlled by clutch-mechanism $G^6$; $G^7$, finger-bar elevating mechanism; and H, a rake extending transversely of the frame-section A at the rear end thereof, and controlled by a foot-lever $H^1$.

The construction is such that the wheel-frame $C^2$ may be turned through an angle of 360° within the annular frame-member C to enable the machine to be turned or guided at will; and furthermore the frame-section A may rock freely transversely with relation to the reach D and wheel-frame $C^2$ owing to the swivel-connection $A^2$, $B^2$, and the sliding connection between the front end of the reach $A^3$ and the standard $C^7$. The frame-section A may constitute side-members $a$ connected by a web $a^1$. The standards $A^4$ are supported on the side members $a$ and the reach $A^3$ is rigidly supported from the side-members $a$ through the medium of the standards $A^4$. The swivel-section $A^2$ constitutes, as shown, a storage-tank for gasolene, which is connected by a pipe $a^2$ with the engine F. The reach B has the cylinder $B^2$ preferably cast integrally with the web $b$ at the rear portion of the reach. The cylinder $A^2$ is grooved circumferentially as shown in Fig. 3, to receive studs $b^1$ joining the two cylinders together; and the cylinder $B^2$ is also equipped with rollers $b^2$ forming anti-friction bearings between the cylinders. Obviously, the studs $b^1$ may be equipped with rollers, although none are shown.

The journals or studs $C^1$ on the annular frame-member C are pivoted in bearings in the ends of the bifurcations $B^1$ and secured by cap-screws $c$ and washers $c^1$. The standard $C^7$ affords bearings for the crank-shaft $C^{10}$, and serves as a support for the steering-mechanism D. The guide $C^8$ is formed integrally with a dome $c^2$ forming the crown of the standard $C^7$, and has a slot $c^3$ formed with flanges $c^4$ with which is slidably connected a block $c^5$ which affords a bearing for a ball $c^6$ on the lower end of a bolt $c^7$ carried by the front end of the reach $A^3$.

The steering mechanism D comprises a longitudinally-disposed shaft $d$ equipped at its rear end with a hand-wheel $d^1$ within convenient reach from the seat E; a bevel-gear $d^2$ secured on the front end of the shaft $d$; a transverse shaft $d^3$ journaled in the standard $C^7$ and equipped with a bevel-gear $d^4$ meshing with the gear $d^2$; a sleeve $d_4$ journaled on the shaft $d^3$ and equipped with a bevel-gear $d^5$ meshing with the gear $d^2$; a pair of sprocket-wheels $d^6$ $d^7$ secured, respectively, on the shaft $d^3$ and sleeve $d_4$; a pair of pinions $d^8$ actuated from the sprocket-wheels $d^6$ $d^7$ by sprocket-chains $d^9$; and an annular rack $d^{10}$ on the upper side of the annular frame-member C and in which the pinions $d^8$ work.

The seat E turns with the wheel-frame $C^2$, in guiding the machine, and the reach $A^3$ preferably is high enough above the seat to accommodate the operator.

The engine F as well as the engine, $C^9$ should be provided with suitable controlling means and with suitable speed and reversing gear-mechanism, with the manual controlling means therefor located within convenient reach of the seat. No means of this character are shown, however.

The bracket G has arms $g$ connected with the frame-section A, and there is a connecting, longitudinal member $g^1$ equipped on its inner side with brackets $g^2$. The brackets $g^2$ support a shaft $g^3$ constituting a portion of the sickle driving mechanism $G^5$. The links $G^1$ are pivoted at their upper ends on bearings concentric with the shaft $g^3$, as shown in Figs. 9 and 10. The lower ends of the links support a shaft $g^4$ which extends longitudi-nally through the casing $G^2$. The casing $G^2$ comprises a lower section $g^5$ equipped with a wheel $g^6$; and a removable upper section $g^7$. The finger-bar $G^3$ preferably comprises a flat bar $g^8$ and a housing $g^9$ of U-shaped cross-section connected with the rear edge-portion of the bar $g^8$. With these parts are connected the fingers or sickle-guards $g^a$. The sickle $G^4$ preferably comprises a bar $g^{10}$ equipped at its ends with perforate heads $g^{11}$; and double-pointed cutting sections $g^{12}$ connected with the bar $g^{10}$ in the usual way. The construction, it will be observed, renders the sickle reversible. The sickle is connected by a rod $g^{13}$ with an eccentric $g^{14}$ on the shaft $g^4$. The inner end of the finger-bar $G^3$ is provided with a head $g^{15}$, bifurcated, as shown in Fig. 9, and equipped with perforate trunnions $g^{16}$ journaled on the shaft $g^4$ and equipped with sprocket-wheels $g^{17}$ connected with sprocket-chains $g^{18}$ forming a part of the adjusting or elevating mechanism $G^7$. The shaft $g^4$ is equipped with sprocket-wheels $g^{19}$ with which are connected sprocket-chains $g^{20}$. The shaft $g^3$ is longitudinally shiftable within a tubular shaft $g^{21}$ which is equipped with sprocket-wheels $g^{22}$ receiving the chains $g^{20}$. The sleeve $g^{21}$ is equipped with bevel-gears $g^{23}$, $g^{24}$, which mesh, respectively, with a relatively small gear $g^{25}$, and a relatively large gear $g^{26}$, with which one side of the adjacent wheel $A^1$ is equipped. The shaft $g^3$ is equipped with clutch-members $g^{27}$ $g^{28}$ which correspond, respectively, with the gears $g^{23}$, $g^{24}$. The shaft $g^3$ is equipped with a head $g^{29}$ with which is connected a shifting lever $g^{30}$ forming a part of the speed - controlling means $G^6$. The lever $g^{30}$ is actuated by a hand-lever $g^{31}$, as shown in Figs. 1 and 2.

The finger-bar elevating mechanism $G^7$ comprises, in addition to the sprocket-wheels $g^{17}$ and chains $g^{18}$, a shaft $g^{32}$ equipped with sprocket-wheels $g^{33}$ connected with the chains $g^{18}$; a worm-wheel $g^{34}$ on the shaft $g^{32}$ meshing with a worm $g^{35}$ on the shaft $g^{36}$; and a hand-wheel $g^{37}$ actuating a gear $g^{38}$ meshing with a pinion $g^{39}$ actuating a bevel-gear $g^{40}$ engaging a bevel-gear $g^{41}$ on the shaft $g^{36}$. The tubular shaft $g^{21}$ above described has journaled thereon a sleeve $g^{42}$ provided with a bearing $g^{43}$ receiving the outer extremity of the corresponding short axle $F^3$.

The operation will be understood readily from the foregoing description. Either one or both of the engines shown may be employed to propel the machine dependent upon the exigencies of the situation. It is proposed to drive the machine ordinarily at a rapid speed, enabling the machine to cut several times as many acres per day as can now be cut with the best horse-propelled machines; and where the nature of the country demands it, both engines may be employed whereby the traction will be effected through all four of the traction-wheels shown. In turning corners, the rear engine may be stopped and the front engine employed. The connections between the front and rear sections of the frame are such as to enable the front section to rock freely with relation to the rear section in a transverse plane, without any sacrifice of strength and durability.

The sickle and finger-bar are allowed a certain amount of movement normally with relation to the frame of the machine, and the sickle may be elevated through 90° from the frame of the machine, by actuating the handwheel $q^{37}$. The sickle itself is reversible enabling it to be used for a longer period without grinding than is possible with a non-reversible sickle. Moreover, in the event of an injury to the point of a cutting-section the sickle may be reversed. The disposition of the rake with relation to the cutter is such that while one swath is being mowed the preceding swath is being raked. Of course, if desired, the rake may be drawn up and kept out of use while the machine is employed for mowing purposes, and the sickle may be drawn up and kept out of use while the machine is being used for raking purposes. Ordinarily, however, both rake and cutter are employed at the same time.

It is evident that many changes in details of construction within the spirit of my invention may be made, hence no undue limitation should be understood from the foregoing detailed description.

What I regard as new, and desire to secure by Letters Patent, is—

1. In a self-propelled mower, the combination of flexibly joined front and rear frame-sections, a wheel-frame supporting the front frame-section and free to turn with relation thereto, steering-means mounted on said wheel-frame and connected with said front frame-section, a traction wheel supporting said wheel-frame, a motor supported on said wheel-frame and geared to said traction wheel, wheels supporting the rear frame-section, and a sickle geared to one of said last-named wheels, for the purpose set forth.

2. In a self-propelled machine, the combination of flexibly joined front and rear frame-sections, a wheel-frame mounted to turn on said front frame-section, a traction-wheel supporting said wheel-frame, a motor mounted on said wheel-frame and geared to said traction-wheel, wheels supporting the rear frame-section, a motor mounted on the rear frame-section and geared to one of the wheels thereof, and a sickle geared to one of the rear wheels, for the purpose set forth.

3. In a self-propelled mower, the combination of flexibly joined front and rear frame-sections, a wheel-frame supporting the front frame-section and capable of turning with relation thereto, steering-means mounted on said wheel-frame and connected with the front frame-section, a traction wheel supporting said wheel-frame, a motor mounted on said wheel-frame and geared to said traction wheel, wheels supporting the rear frame-section, a finger-bar adjustably connected with one side of the rear frame-section, and a sickle carried by said finger-bar and geared to one of the rear wheels, for the purpose set forth.

4. In a self-propelled machine of the character set forth, the combination of a front frame-section and a rear frame-section having swivel connection therewith to permit relative turning about a longitudinal axis, a wheel-frame supporting the front frame-section and capable of turning about a vertical axis, a traction-wheel supporting said wheel-frame, steering-means connected with said wheel-frame, a pair of rear wheels, and a sickle supported from the rear frame-section and geared to one of the rear wheels, for the purpose set forth.

5. In a self-propelled machine, the combination of flexibly joined front and rear frame-sections, wheels supporting the same, steering-means connected with the front frame-section, a motor mounted on the frame and geared to a wheel of the machine, a laterally supported sickle geared to a wheel of the machine, and a transversely-disposed rake extending across the rear end of the frame, for the purpose set forth.

6. In a mower, the combination with a frame of a finger-bar provided with a trunnion equipped with a sprocket wheel, a sprocket chain connected with said wheel, and actuating means for said sprocket chain, including a worm and worm-wheel, for the purpose set forth.

7. In a machine of the character set forth, the combination of a frame, wheels supporting the same, one of said wheels being provided with lateral bevel gears of different diameters, a hollow shaft adjacent to said gears equipped loosely with pinions engaging said gears, a longitudinally shiftable internal shaft equipped with clutches serving to engage said pinions, a parallel shaft geared to said first-named shaft, and a sickle actuated from said third-named shaft, for the purpose set forth.

THOMAS J. THORP.

In presence of—
F. M. WIRTZ,
J. H. LANDES.